United States Patent
Friedrich

(10) Patent No.: US 7,733,217 B2
(45) Date of Patent: Jun. 8, 2010

(54) METHOD FOR DATA TRANSMISSION IN RFID OR REMOTE SENSOR SYSTEMS

(75) Inventor: Ulrich Friedrich, Ellhofen (DE)

(73) Assignee: Atmel Automotive GmbH, Heilbronn (DE)

(*) Notice: Subject to any disclaimer, the term of this patent is extended or adjusted under 35 U.S.C. 154(b) by 581 days.

(21) Appl. No.: 11/081,551

(22) Filed: Mar. 17, 2005

(65) Prior Publication Data
US 2005/0206552 A1    Sep. 22, 2005

(30) Foreign Application Priority Data
Mar. 17, 2004    (DE) .................. 10 2004 013 156

(51) Int. Cl.
*G01S 13/74*    (2006.01)
(52) U.S. Cl. .................... 340/10.3; 340/10.1
(58) Field of Classification Search ............... 340/10.3, 340/10.1, 10.2, 10.31, 10.34; 342/42
See application file for complete search history.

(56) References Cited

U.S. PATENT DOCUMENTS

| | | | |
|---|---|---|---|
| 6,061,614 A | 5/2000 | Carrender et al. | |
| 6,172,609 B1 * | 1/2001 | Lu et al. | 340/572.4 |
| 6,198,381 B1 * | 3/2001 | Turner et al. | 340/10.1 |
| 6,289,209 B1 | 9/2001 | Wood, Jr. | |
| 6,686,829 B1 * | 2/2004 | Hohberger et al. | 340/10.1 |
| 2003/0019929 A1 | 1/2003 | Stewart et al. | |
| 2003/0097302 A1 * | 5/2003 | Overhultz et al. | 705/14 |
| 2003/0133435 A1 * | 7/2003 | Friedrich | 370/349 |
| 2003/0214934 A1 | 11/2003 | Gila et al. | |

FOREIGN PATENT DOCUMENTS

| | | |
|---|---|---|
| DE | 101 37 247 A1 | 2/2003 |
| EP | 0 935 211 A2 | 8/1999 |
| EP | 0 950 288 | 10/1999 |
| EP | 1 023 687 | 8/2000 |
| WO | WO 03/062861 A1 | 7/2003 |

* cited by examiner

*Primary Examiner*—Brian A Zimmerman
*Assistant Examiner*—Yong Hang Jiang
(74) *Attorney, Agent, or Firm*—Muncy, Geissler, Olds & Lowe, PLLC

(57) ABSTRACT

A method and apparatus for transmitting data in a radio frequency identification system, which includes a reader and at least one transponder, is provided. The reader transmits data sequences to the transponder including at least command data, associated check data, and a subsequent return link header data. Upon receiving unrecognized command data and/or unsupported parameter and address data the transponder notifies the reader of this condition. The notification takes place at times when the reader transmits end signals indicating an end of a data sequence, transmits an optional parameter and address data, or transmits the return link header data. Thus, communication between the reader and other transponders is not disrupted when a transponder cannot execute a command.

23 Claims, 2 Drawing Sheets

METHOD FOR DATA TRANSMISSION IN RFID OR REMOTE SENSOR SYSTEMS

This nonprovisional application claims priority under 35 U.S.C. §119(a) on German Patent Application No. DE 102004013156.2, which was filed in Germany on Mar. 17, 2004, and which is herein incorporated by reference.

BACKGROUND OF THE INVENTION

1. Field of the Invention

The present invention relates to a method for transmitting data in a radio frequency identification system (RFID system), which includes a reader and at least one transponder known as a tag, or for transmitting data between a reader and a remote sensor.

2. Description of the Background Art

Automatic identification methods, also known as Auto-ID, have become widespread in recent years in many service fields, in procurement and distribution logistics, in trade, in production, and in material flow systems. The goal of Auto-ID in this context is the comprehensive provision of information concerning persons, animals, objects and goods.

One example of such Auto-ID systems is the widely used chip card, in which a silicon memory chip is powered, read and if necessary reprogrammed by a reader by means of mechanical galvanic contact. In this context, the acquisition device is generally referred to as a reader regardless of whether it can only read data or can also write it.

In RFID systems, power can be supplied to the data carrier—the transponder—not only by galvanic contact, but also in a non-contact manner using electromagnetic fields in the radio frequency range.

RFID systems typically have two basic components, namely the transponder, i.e. an integrated circuit having a coupling element such as a dipole antenna as a transmitting and receiving device and also an electronic microchip, and a reader, which is typically a high-frequency module (transmitter/receiver) and likewise has a coupling element. The reader supplies the transponder, which as a rule does not have its own voltage supply, with energy and a clock; data are transmitted both from the reader to the transponder (forward link) and in the opposite direction (return link).

Such RFID systems, whose range is significantly greater than 1 m, use electromagnetic waves in the UHF and microwave regions. These systems mostly use a backscatter method, named for its physical principle of operation; in this method, a part of the energy arriving at the transponder from the reader is reflected (scattered back, hence backscattering) and may be modulated in the process in order to transmit data.

Especially in material flow systems, such as those known as supply chain systems, a great number of transponders can come together in the field of one reader, which must communicate with each individual transponder. In this regard, it may be the case that the individual transponders differ with regard to a protocol they support. This application can be addressed through the use of multi-protocol readers which sequentially try the possible protocols. At the same time, the transponders must be able to respond appropriately, i.e., a transponder must not answer when a protocol other than its own is used.

In any case, RFID systems or remote sensor systems are generally defined by a specific base protocol that is understood by all transponders or sensors. This base protocol is augmented by extensions in the address and/or parameter range and/or command sequences so that different protocol levels can be implemented in different transponders or remote sensors if necessary. This situation is to be expected when protocol extensions or reductions (e.g., to a minimal protocol) are possible. In this way, especially in open systems, there exists the danger that while the transponders or sensors are in principle capable of extracting a command from command data transmitted by a reader and translating it into a binary data stream, only a (sub) group of transponders or sensors can recognize and execute the command, while another (sub) group cannot. The same applies to transmitted command extensions such as the aforementioned parameter or address data.

The consequences of such compatibility problems can include disruption of the communication between the reader and the transponders or sensors, so controlled error handling is absolutely necessary for the described situation.

A method for this purpose is known from ISO 18000-6 FDIS 2003(E), Section 7.4.8, in which a transponder returns an error code to the reader upon detection of an error condition of the aforementioned type. This error code contains the coding "Unrecognized command received" (loc. cit., Table 27), which in the situation described above can have the result that one transponder executes the command and returns a corresponding positive response to the reader, while another transponder transmits the aforementioned error code. In this way, two data streams can be superimposed in the backscatter, which can make communication impossible or at least more difficult.

Furthermore, the aforementioned ISO standard also permits user-specific commands and corresponding parameter sets in the command vocabulary. If transponders or remote sensors of this type are present in an open Auto-ID system, the aforementioned problems will necessarily arise.

There are also conventional methods for data transmission in RFID systems, which allow decoded data to be sent back to the reader even during a running transmission of command data from the reader to the transponder through the forward link. In this way the reader can rapidly determine whether a transponder has detected a transmission error. However, the method does not encompass notifying the reader as to whether the command per se and/or its associated extensions are recognized by the transponder. Moreover, it must also be seen as a disadvantage that the cited method requires the reader to have full-duplex capability during the forward link (the connection from the reader to the transponder) and that the transponder must operate synchronously with the reader.

SUMMARY OF THE INVENTION

It is therefore an object of the present invention to provide a data transmission method for RFID or remote sensor systems that, especially in open systems, avoids disruption and blockage of communications while avoiding the aforementioned disadvantages.

The object is attained through a method for transmitting data in an RFID system, wherein the reader transmits data sequences to the transponder or sensor including at least command data, associated check data, or optional parameter and address data, as well as subsequent return link header data for a return link from the transponder or sensor to the reader. The transponder or sensor, upon receiving unrecognized command data and/or unsupported parameter and address data accompanied in each case by correct check data, notifies the reader of this condition at times when the reader transmits end signals indicating an end of a data sequence and/or optional parameter and address data or during the return link header data. In this context, the notification in accordance with the invention need not necessarily be of an "active" nature through transmission, but instead can also have a "passive" nature, e.g. in the form of silence in full-duplex systems, as is described below in greater detail.

In this way, a transponder or sensor that cannot execute a (correctly transmitted) command because it does not recognize it or because associated parameter or address data are not supported can communicate this error condition to the reader without disrupting communication in the entire area of the reader. Thus, it is particularly beneficial, especially for products that conform to ISO 18000-6 Type A, to utilize the interval between the end of the forward link and the beginning of the return link.

In a further embodiment, the reader can be notified of unrecognized command data and unsupported parameter and address data at different respective times within a data sequence, for example, upon transmission of the end signals or the transmission of the return link header data in the form of header data. As a result of the time separation thus accomplished, the reader is thus also in a position to distinguish among different error sources and evaluate the severity of the error.

In order to notify the reader of an error condition, a transmission from the reader can be modulated, for example, by using a subcarrier. Alternatively, it is also possible to notify the reader in full-duplex operation during the forward link by terminating a transmission from the transponder or sensor to the reader. If the transponder or sensor in question is alone in the reader's area, the reader can, in a simple manner, detect the absence of the receive streams in this situation and break off the obviously unsuccessful communication that is in process.

In a further embodiment, provision is also made that, after the termination of a transmission from the transponder or sensor, the reader in its turn breaks off a transmission in progress and transmits a new data sequence. The new data sequence preferably contains command data recognized by all transponders or sensors potentially that are associated with the system and/or parameter and address data supported by all of these transponders or sensors, for example, from a generally recognized subset of commands that are recognized by all members of the system. In this way the reader can also "inquire" about a transponder's or sensor's version and thus its capabilities.

In another embodiment of the method according to the invention, possible disruption of the reader's communication with additional transponders or sensors in its area can also be avoided in that after notifying the reader, the at least one transponder or sensor withdraws from communication with the reader until it receives new, recognized command data.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
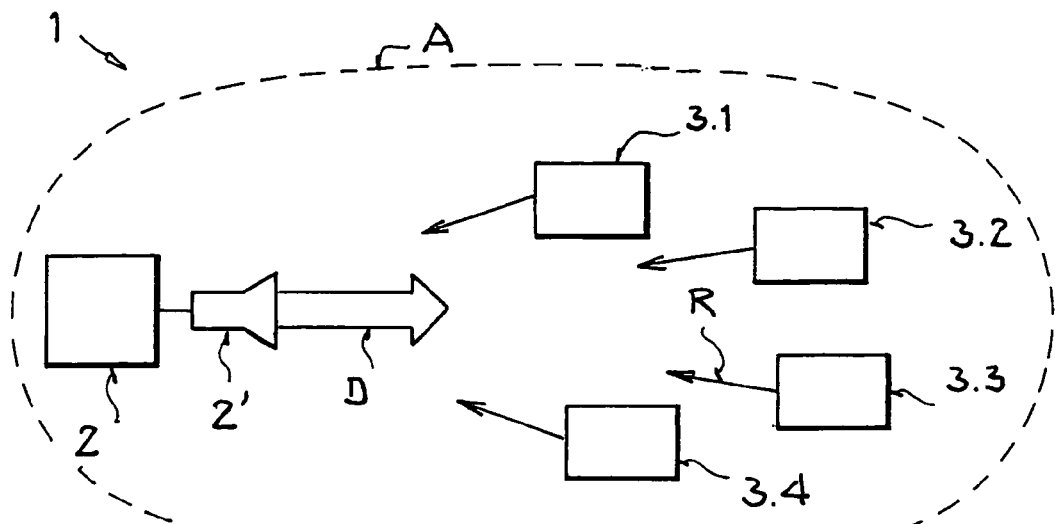
FIG. 1 is a schematic representation of an RFID system according to an embodiment of the present invention.

FIG. 1 shows an RFID system 1 having a reader 2 with an appropriate transmitter and receiver 2', such as a dipole antenna, and a plurality of transponders 3.1-3.4 which are located, for example, within a response area A of the reader 2. Although the discussion that follows mentions only transponders, the method can also be used, for example, for remote sensor systems or for mixed sensor/transponder systems, etc.

In this context, a data stream D transmitted by the reader 2 or the transmitter 2' is received substantially simultaneously by all transponders 3.1-3.4. The data transmission from the reader 2 to a transponder 3.1-3.4 is hereinafter referred to as a forward link. The transponders 3.1-3.4 respond at least to a completed data transmission from the reader 2 through return links R, wherein a part of the energy arriving at the transponders 3.1-3.4 from the reader 2 together with the data D is reflected (scattered back, e.g., backscattering) and can, if applicable, be modulated to transmit data from the transponders 3.1-3.4 to the reader 2. In a full-duplex system 1, data transmission to the reader 2 can take place even during the forward link.

Figure 2A:
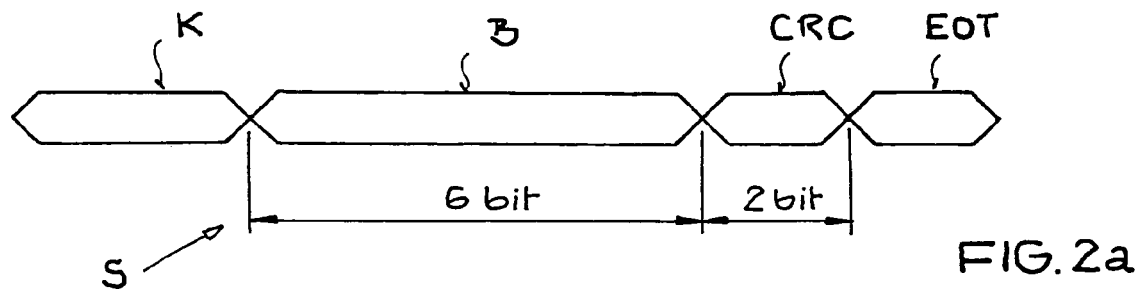
FIG. 2a shows a first command data format of an embodiment of the present invention.
Figure 2B:
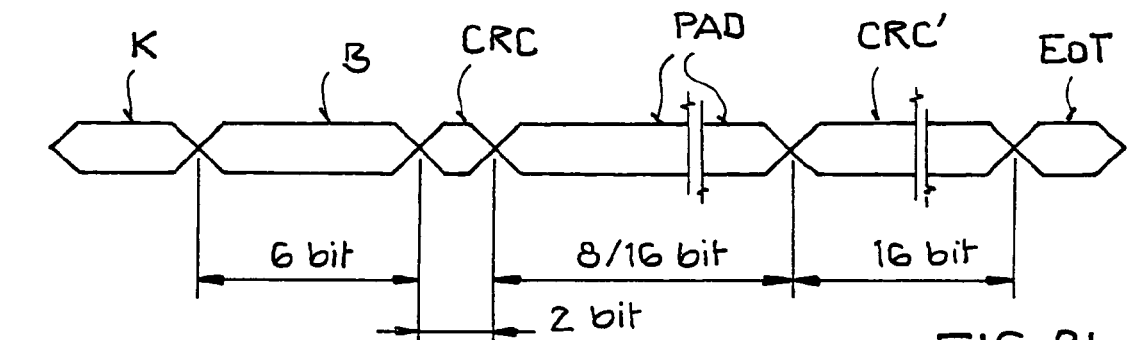
FIG. 2b shows a second command data format of an embodiment of the present invention.

FIGS. 2a, b show example portions of data being transmitted in the data stream D in the form of a short command S (FIG. 2a) and a long command L (FIG. 2b).

In accordance with the invention, the short command S shown in FIG. 2a sequentially includes a number of fields, namely header data K, known as the header, in which references and parameters for the forward link are transmitted, followed by the actual command data B (length 6 bits), check data in the form of a CRC checksum CRC (cyclic redundancy check) 2 bits in length, and end data EOT (end of transmission) to indicate the end of the command data sequence. The appearance and use of CRC checksums are known to one skilled in the art (see, e.g., Finkenzeller, RFID-Handbuch, 3rd edition, 2002, Hanser, p. 200 ff., which is incorporated herein by reference.)

The end data EOT transmitted within the scope of the present invention contain two end signals (EOF symbols EOF1, EOF2; see also FIG. 4), whose reference timing is contained in the header data K so that they can be recognized as end signals by the transponders 3.1-3.4. The individual symbols are delimited by field gaps or modulation dips, known as notches, arranged at a specific time interval, wherein the time interval of the notches in comparison with the aforementioned reference timing specifies the respective meaning (binary zero, binary one, EOF—end of frame) (see also FIG. 4).

In addition to the fields already shown in FIG. 2a, the long commands L according to FIG. 2b have, following the CRC-checksum CRC, additional parameter and address data PAD (length 8 or 16 bits, for example) for the command B as well as additional CRC-check data CRC'. Finally, the end data EOT follows.

The command data B and the CRC-check data CRC constitute what is called a command byte; upon being received by a transponder 3.1-3.4, the command byte is stored therein and is checked using the CRC-data.

Figure 3:
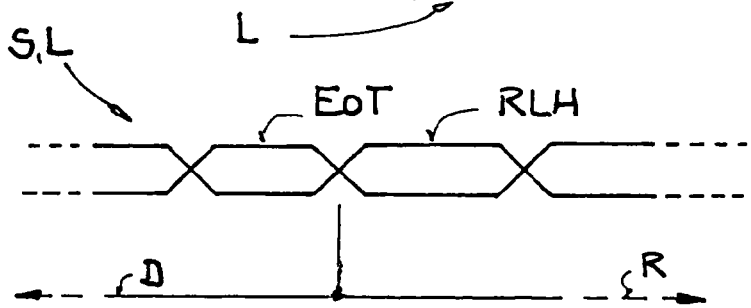
FIG. 3 shows return channel header data that can follow the command data from FIGS. 2a,b.

Each short command S or long command L is followed in time by return link (header) data RLH (return link header), as is shown in FIG. 3. These data are used by the reader 2 to initialize the return link R, and communicate general communications parameters used in the return link, such as timing information (see above) and modulation references. The return link header data RLH is divided into four sections or fields defined by corresponding notches (see also FIG. 4).

When the data stream D arriving from the reader 2 contains command data B, and/or parameter and address data PAD associated with a specific command B, that are not supported by one or more transponders 3.1-3.4 in the area A, i.e. that have correct CRC-data CRC but cannot be executed, the situation can occur in which one transponder executes the command B and returns a corresponding positive response to the reader 2, while another transponder, for example, transmits an error code. In this way, two data streams are superimposed in the backscatter, which can make communication between the reader 2 and the transponders 3.1-3.4 impossible or at least more difficult. If a transponder that cannot execute a command B sends no error message, such an error condition could go undetected, or at a minimum the reader 2 would receive no information about the possible cause of the error.

In view of the foregoing, in the case where a transponder 3.1-3.4 does not recognize or does not support a received, checked command B, it must always be assumed that the command B exists per se. Thus, in order to avoid disrupting the subsequent communication between the reader 2 and other transponders that are executing the command, the transponder returns the necessary error message to the reader 2 using only fields that are not used for returning the actual useful data. In the course of the example embodiment shown here, these are the first two sections of the return link header RLH and a first symbol that follows the first EOF symbol EOF1 transmitted by the reader 2, which as a rule is the second EOF symbol EOF2 of the EOT field EOT. The latter is not necessarily the case, because the reader may, under certain circumstances, transmit additional (binary) symbols between the EOF symbols.

Figure 4:
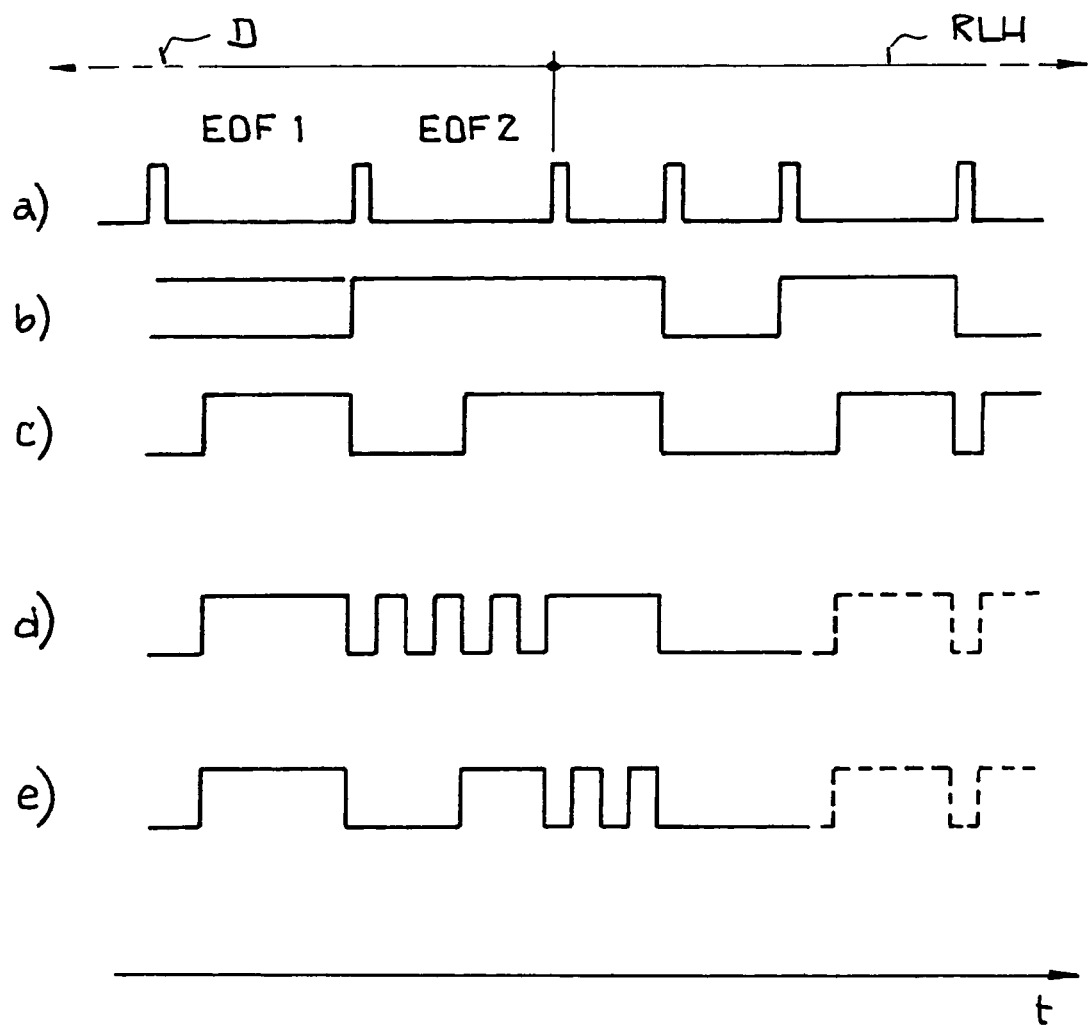
FIG. 4 illustrates signal waveforms according to an embodiment of the present invention.

FIG. 4 illustrates the aforementioned situation. From top to bottom, the following over time t is shown:

(a) a sequence of notch signals (notches); in particular, a notch is present at the beginning of each of the aforementioned sections of the return link header RLH;

(b) a logical data stream to be transmitted from the transponder to the reader (binary HIGH/LOW signal levels), "Level2send;" here, the backscatter signals shown during the symbols EOF1, EOF2 of the forward link depend on the prior history of the communication, only parts of which are shown here;

(c) a "Level2send" signal in a predetermined modulation coding, here especially a "3phase1" coding, as it would be transmitted to the reader in an error-free case;

(d) a "3phase1" signal with an error message according to the invention for the case in which the CRC data of the command are correct but the command itself is unrecognized—at least by the transponder in question; and (e) a "3phase1" signal with an error message according to the invention for the case in which the command itself is recognized, but an associated address, for example a memory address of the transponder, is not supported. This case is relevant to the transmission of a long command L (see also FIG. 2).

It can be seen in FIG. 4 how an affected transponder 3.1-3.4 (see also FIG. 1), i.e., a transponder that is unable to execute a command initiated by the reader 2, sends a message to the reader 2 only at times that are not (yet) being used for communication from the transponder back to the reader. Consequently, upon receiving unrecognized command data and/or unsupported address and parameter data—together with correct check data in each case—the transponder in question notifies the reader of this (error) condition only at times when the reader is transmitting end signals to indicate an end of a data sequence and/or the return link header data. To this end, as shown in the lowest line of FIG. 4, e.g. line (e), the first section of the return link header data RLH, in particular, is modulated with a subcarrier. FIG. 4 shows only the digital control stream—independent of any specific modulation type—that is needed for this purpose, and which is subsequently used to perform ASK (amplitude shift keying) or PSK (phase shift keying) modulation in the event that address information contained in the parameter and address data PAD (see also FIG. 2b) contained an error, i.e. is not supported for the command by the transponder in question. Thus, in order for the transponder to notify the reader, the latter's transmission is modulated by the former.

Similarly, in accordance with the second line from the bottom in FIG. 4, e.g., line (d) the symbol that follows the symbol EOF1, here the signal EOF2, is modulated to indicate a command that is unrecognized per se. Moreover, the second section of the return link header data RLH can be modulated when a parameter specification contained in the parameter and address data PAD (see also FIG. 2b) was in error (not shown in FIG. 4). In this way, as a result of the separation in time of the error indications, the reader is in a position to distinguish the cause and possibly also the severity of the error, in that notification to the reader of unrecognized command data and unsupported parameter and address data each take place at different times in a data sequence, for example upon transmission of the end signals, specifically the EOF2 signal, or during transmission of the return link header data RLH.

Following the error report to the reader, the relevant transponder withdraws from communication with the reader and from the execution of the (impossible to this transponder) command, which is shown in the last two lines of FIG. 4 using dashed lines. In this way, according to the invention no interference with subsequent message transmission is to be feared. The transponder in question will only participate in communication again after it receives a new, valid command.

Obviously, it is possible in accordance with the invention to use other coding and modulation methods than those mentioned above. In particular, instead of the subcarrier modulation described with regard to FIG. 4, a modulation code according to the predefined parameter setting, here "3phase1", can be used.

Through the use of the inventive method, the reader 2 is thus in a position to detect that at least one transponder 3.1-3.4 which is unable to execute a certain command is present in the area A (FIG. 1), and to determine the cause of this situation.

In the case of the long commands L shown in FIG. 2b, there exists an additional option for a transponder to notify the reader of errors: If, as described in detail above, the command B is recognized and the check data CRC is also correct, then the transponder simply stops transmitting additional received data to the reader during the forward link, i.e. the transponder basically goes silent. Thus, in accordance with the invention, a transmission from the transponder to the reader is terminated in order to notify the reader. Consequently, upon receiving unrecognized command data together with valid check data, the transponder now notifies the reader of this condition at those times when the reader transmits the subsequent parameter and address data PAD (FIG. 2b). In particular, if the relevant transponder is alone in the area A of the reader 2

(FIG. 1), the latter can detect the absence of the receive streams usually arriving and for this reason also break off the communication in progress. In other words: Once the transponder terminates transmission, the reader in turn breaks off a transmission in progress and then transmits a generally understandable subset of commands, i.e. a new data sequence, which is typically recognized by all potential members (transponders) of the system 1, which is to say that the new data sequence contains command data B recognized by all transponders potentially associated with the system and/or parameter and address data PAD supported by all these transponders. In this way, for example, the reader can also inquire about the versions of transponders and their capabilities.

If the communication is not terminated on account of the aforementioned "silent" error message, an additional, active notification takes place in the symbol following the EOF1 symbol (FIG. 4: EOF2), and if applicable in the return link header data RLH, as described above.

Thus, within the scope of the present invention, if a transponder 3.1-3.4 cannot support a reader-initiated command or its associated parameter data, it is possible to completely eliminate the transmission of predefined error codes in a standard return link, i.e. at times when other transponders may in some cases transmit important data to the reader, in order to avoid interfering with communication with the other transponders.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for transmitting data in a radio frequency identification system having a reader and at least one transponder, or for transmitting data between a reader and a remote sensor, the method comprising:
   transmitting a data sequence from the reader to the transponder or the remote sensor, the data sequence including command data accompanied by associated check data and/or parameter and address data accompanied by correct check data, and return link header data for providing a return link from the transponder or the remote sensor to the reader;
   determining by the transponder or the remote sensor of an unrecognized command data and/or unsupported parameter and address data accompanied in each case by correct check data; and
   notifying the reader of the unrecognized command data and/or unsupported parameter and address data while the reader transmits end signals indicating an end of the data sequence or an end of the parameter and address data, or while the return link header data is transmitted.

2. The method according to claim 1, wherein the reader is notified of the unrecognized command data and/or the unsupported parameter and address data at different respective times within the data sequence.

3. The method according to claim 1, wherein a transmission from the reader is modulated in order to notify the reader.

4. The method according to claim 1, wherein a transmission from the transponder or sensor to the reader is terminated in order to notify the reader.

5. The method according to claim 4, wherein, after the termination of the transmission from the transponder or sensor, the reader terminates a transmission in progress and transmits a new data sequence.

6. The method according to claim 5, wherein the new data sequence contains command data recognized by all transponders or sensors that are associated with the system and/or parameter and address data supported by all the transponders or sensors.

7. The method according to claim 1, wherein, after notifying the reader, the transponder or sensor withdraws from communication with the reader until new recognized command data is received.

8. The method according to claim 1, wherein the data sequence further includes optional parameter and address data.

9. The method according to claim 1, wherein the reader is notified of the unrecognized command data and/or the unsupported parameter and address data upon transmission of the end signals or the transmission of the return link header data as header data.

10. A transponder comprising:
    an antenna; and
    an integrated circuit being electrically connected to the antenna,
    wherein the transponder receives by the antenna at least a transmitted data sequence, the transmitted data sequence including an end of data portion and a return link header portion,
    wherein, upon detection of an unrecognized command data and/or unsupported parameter and address data accompanied in each case by correct check data, an unrecognized command code is transmitted during receipt of the end of data portion or the return link header portion, and
    wherein when no unrecognized command data and/or unsupported parameter and address data is detected, the transponder transmits data after receipt of the return link header portion.

11. The transponder according to claim 10, wherein the transmitted data sequence further includes a command data portion, a check data portion, an additional parameter and address data portion, and an additional check data portion.

12. The transponder according to claim 11, wherein the command data portion, the check data portion, the additional parameter and address data portion, and the additional check data portion precede the end of data portion and the return link header portion in the data sequence.

13. The transponder according to claim 10, wherein the unrecognized command code is transmitted to a reader.

14. The transponder according to claim 13, wherein the reader transmits the data sequence to the transponder.

15. The transponder according to claim 10, wherein, upon detection of the unrecognized command data and/or unsupported parameter and address data, the unrecognized command code is transmitted only during receipt of the end of data portion or the return link header portion.

16. The transponder according to claim 10, wherein the unrecognized command code is selectively transmitted during the receipt of the end of data portion or the return link header portion based on a cause of the unrecognized command data and/or unsupported parameter and address data.

17. The method according to claim 1, wherein a time when the reader is notified of the unrecognized command data and/or unsupported parameter and address data is based on a cause of the unrecognized command data and/or unsupported parameter and address data.

18. The method according to claim 1, wherein, if the received data sequence includes the unrecognized command data, the reader is notified of the error at a first time within the data sequence, and wherein, if the received data sequence includes the unsupported parameter and address data, the reader is notified of the unrecognized command data and/or unsupported parameter and address data at a second time within the data sequence.

19. The method according to claim 1, wherein, if the received data sequence includes the unrecognized command data, the reader is notified of the error only when the reader is transmitting the end signals, and wherein, if the received data sequence includes the unsupported parameter and address data, the reader is notified of the unrecognized command data and/or unsupported parameter and address data only when the reader is transmitting the return link header data.

20. The method according to claim 1, further comprising:

determining a cause of the unrecognized command data and/or unsupported parameter and address data based on whether the reader is notified of the unrecognized command data and/or unsupported parameter and address data when the reader transmits the end signals indicating the end of the data sequence or the end of the parameter and address data, or when the return link header data is transmitted.

21. The method according to claim 1, wherein the data sequence further includes header data, and wherein the header data, the command data, the associated check data, the parameter and address data, and the correct check data each precede the end signals and the return link header data in the data sequence.

22. The method according to claim 1, wherein the reader is a multi-protocol reader.

23. the method according to claim 1 wherein said at least one transponder comprises at least two transponders.

* * * * *